United States Patent
Abe et al.

[11] Patent Number: 5,858,499
[45] Date of Patent: *Jan. 12, 1999

[54] POLYCARBONATE COPOLYMER CONTAINING OXASPIROUNDECANE GROUP AND PRODUCTION PROCESS THEREFOR

[75] Inventors: Masanori Abe; Keisuke Shinohara; Wataru Funakoshi; Katsushi Sasaki, all of Iwakuni, Japan

[73] Assignee: Teijin Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 769,418

[22] Filed: Dec. 19, 1996

[51] Int. Cl.$^6$ .................................................. C08G 64/06
[52] U.S. Cl. ........................ 428/64.7; 528/196; 528/204
[58] Field of Search .................................. 528/196, 204; 428/64.7

[56] References Cited

U.S. PATENT DOCUMENTS

| | | |
|---|---|---|
| 2,945,008 | 7/1960 | Caldwell et al. . |
| 4,495,345 | 1/1985 | Kawakami et al. . |
| 5,021,541 | 6/1991 | Masumoto ........................ 528/204 |

FOREIGN PATENT DOCUMENTS

| | | |
|---|---|---|
| 035619 | 2/1988 | Japan . |
| A48761 | 4/1990 | Japan . |

OTHER PUBLICATIONS

Chemical Abstract 116:195635 (of J04008761).
Patent Abstracts of Japan, vol. 12, No. 248 (C–511), 13 Jul. 1988 & JP 63 035619 A (Hitachi Ltd.) 16 Feb. 1988.

*Primary Examiner*—David Buttner

[57] ABSTRACT

A polycarbonate copolymer which consists essentially of 5 to 95 mol % of recurring units containing a specific spiroglycol unit and 95 to 5 mol % of recurring units containing a specific biphenol unit, and has a reduced viscosity ($\eta_{sp}/c$), measured at 20° C. in a solution containing methylene chloride as a solvent and having a concentration of 0.5 g/dl, of at least 0.3 dl/g, a photoelasticity coefficient of $70\times10^{-13}$ cm$^2$/dyne or less, and a glass transition temperature of at least 95° C.; and a process for the production thereof. This polycarbonate copolymer is useful as a material for an information transmission medium or an information recording medium.

23 Claims, No Drawings

POLYCARBONATE COPOLYMER CONTAINING OXASPIROUNDECANE GROUP AND PRODUCTION PROCESS THEREFOR

DETAILED DESCRIPTION OF THE INVENTION

This invention relates to a polycarbonate copolymer containing an oxaspiroundecane group and to a production process therefor. More specifically, it relates to a novel polycarbonate copolymer having excellent optical properties and to an industrially advantageous, efficient production process therefor.

Since a polycarbonate resin produced by reacting 2,2-bis(4-hydroxyphenyl)propane (so called "bisphenol A") with a carbonate forming compound such as phosgene or diphenyl carbonate is excellent in transparency, heat resistance and mechanical strength, it has a wide range of application.

However, along with the diversification of its application, requirements for a polycarbonate resin are becoming more and more strict, and the development of a polycarbonate resin having more excellent properties is desired. Particularly, a molded article obtained from a conventional polycarbonate resin by an injection molding or the like is liable to have a large optical distortion caused by stress, i.e., large birefringence. Therefore, for a material for optical equipments of which an optical distortion must be considered, such a polycarbonate resin is not preferable.

U.S. Pat. No. 2,945,008 discloses in its specification a high melting linear highly polymeric polyester comprising recurring units having the following formula:

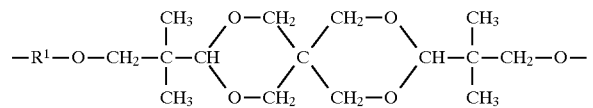

wherein $R^1$ represents the non-functional residue of a bifunctional carboxy compound.

In Example 3 of the above U.S. patent, a crystalline polycarbonate having a melting point of 260° to 270° C. is obtained by polycondensing spiroglycol containing the structure of the above formula and diethylcarbonate in the presence of sodium ethoxide as a catalyst.

JP-A 4-8761 (the term "JP-A" as used herein means an "unexamined published Japanese patent application") discloses a polycarbonate composition having excellent transparency and strength, which comprises an aromatic polycarbonate and a glass filler having a refractive index of 1.57 or more. In Synthesis Example 2 of the publication, white powdery copolycarbonate is obtained, as a synthesis example of the above aromatic polycarbonate, from 4.4 kg of bisphenol A, 7.0 g of dibenzoate of 3,9-bis(1,1-dimethyl-2-hydroxyethyl)-2,4,8,10-tetraoxaspiro[5.5]undecane, namely, spiroglycol dibenzoate (SGOB), 168 g of p-ter-butylphenol and 3.8 kg of phosgene by an interfacial polycondensation process.

U.S. Pat. No. 4,495,345 discloses in its specification an optical resin composition which includes a main component being a polycarbonate, which has a melt flow rate of more than or equal to 5.0 g/10 min as measured based on ISO R-1133 Standard under the conditions of 230° C. and 5 kgf. and has a glass transition point of more than or equal to 100° C.

This U.S. patent merely discloses a polycarbonate of bisphenol A and a polycarbonate of tetrachlorobisphenol A as a concrete example of the polycarbonate.

It is therefore an object of the present invention to provide a novel polycarbonate copolymer having excellent optical properties.

It is another object of the present invention to provide a polycarbonate copolymer having excellent transparency and low photoelasticity coefficient.

It is still another object of the present invention to provide a polycarbonate copolymer having excellent moldability, heat resistance and mechanical strength in addition to the above excellent optical properties.

It is a further object of the present invention to provide a process for producing the polycarbonate copolymer of the present invention having the above excellent properties industrially advantageously and efficiently.

It is a still further object of the present invention to provide use of the above polycarbonate copolymer of the present invention as a material for an information transmission medium or an information recording medium.

The above and other objects and advantages of the present invention will become apparent from the following description.

According to the present invention, firstly, the above objects and advantages of the present invention are attained by a polycarbonate copolymer, which consists essentially of 5 to 95 mol % of recurring units represented by the following formula (I):

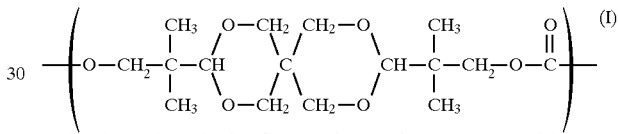

and 95 to 5 mol % of recurring units represented by the following formula (II):

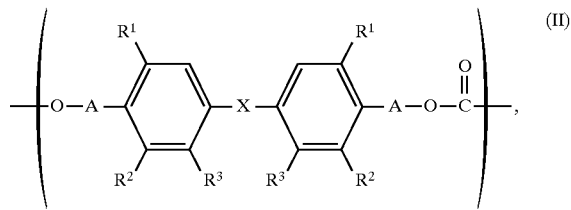

wherein $R^1$ is a hydrogen atom, an alkyl group having 1 to 6 carbon atoms or an aryl group having 6 to 10 carbon atoms; $R^2$ and $R^3$ are each independently a hydrogen atom or an alkyl group having 1 to 6 carbon atoms; A is a single bond or forms, together with the oxygen atom adjacent to A, a group —O—($C_{2-4}$ alkylene group)—O—; X is selected from the class consisting of a group

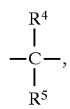

(in which $R^4$ and $R^5$ are each independently a hydrogen atom, an alkyl group having 1 to 6 carbon atoms or an aryl group having 6 to 10 carbon atoms), a group

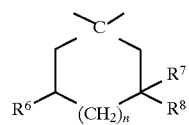

(in which $R^6$, $R^7$ and $R^8$ are the same or different and each a hydrogen atom or an alkyl group having 1 to 6 carbon atoms, and n is 0 or 1), a group

—O—, —S—, —SO—, —SO$_2$—, a fluoridene group and a group

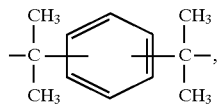

and which has a reduced viscosity ($\eta_{sp}/c$), measured at 20° C. in a solution having a concentration of 0.5 g/dl and containing methylene chloride as a solvent, of at least 0.3 dl/g, a photoelasticity coefficient of $70 \times 10^{-13}$ cm$^2$/dyne or less, and a glass transition temperature of at least 95° C.

The polycarbonate copolymer of the present invention consists essentially of the recurring units of the above formula (I) and the recurring units of the above formula (II), as described above.

In the above formula (II), $R^1$ is a hydrogen atom, an alkyl group having 1 to 6 carbon atoms or an aryl group having 6 to 10 carbon atoms.

The alkyl group having 1 to 6 carbon atoms may be of straight chain or branched chain, as exemplified by methyl, ethyl, n-propyl, iso-propyl, n-butyl, iso-butyl, sec-butyl, tert-butyl, n-pentyl and n-hexyl groups.

The aryl group having 6 to 10 carbon atoms is exemplified by phenyl, tolyl, xylyl, cumyl and naphthyl groups.

$R^2$ and $R^3$ may be the same or different and a hydrogen atom or an alkyl group having 1 to 6 carbon atoms. Examples of the alkyl group having 1 to 6 carbon atoms are the same as those provided for the above $R^1$.

In the group —A—O—, A is a single bond and the group —A—O— represents, as a whole, an oxy group (—O—) or a group —O—(C$_{2-4}$ alkylene group)—O—. Illustrative examples of the alkylene group having 2 to 4 carbon atoms in the latter group include 1,2-ethylene, 1,1-ethylene, 1,3-trimethylene, 1,2-propylene and 1,4-tetramethylene.

In the group represented by X,

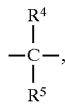

wherein $R^4$ and $R^5$ may be the same or different, selected from a hydrogen atom, an alkyl group having 1 to 6 carbon atoms and an aryl group having 6 to 10 carbon atoms, illustrative examples of the alkyl group having 1 to 6 carbon atoms and the aryl group having 6 to 10 carbon atoms represented by $R^4$ and $R^5$ are the same as those provided for the above group $R^1$.

Preferred examples of the group

include 1-phenyl-1-methylmethylene, propylmethylene and 2,2-propylidene groups.

In the group represented by X,

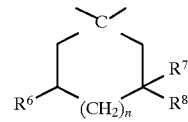

wherein $R^6$, $R^7$ and $R^8$ may be the same or different, selected from a hydrogen atom and an alkyl group having 1 to 6 carbon atoms, and n is 0 or 1, examples of the alkyl group having 1 to 6 carbon atoms represented by $R^6$, $R^7$ and $R^8$ are the same as those provided above for $R^1$.

Preferred examples of the group

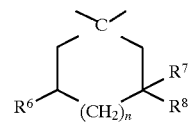

include cyclohexylidene and 3,3,5-trimethyl-1,1-cyclohexylidene groups.

The group X may be a group

—O—, —S—, —SO—, —SO$_2$—, a fluoridene group represented by the following formula

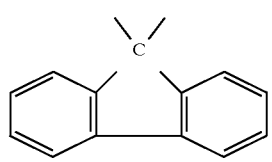

or a group represented by the following formula

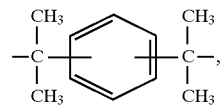

Preferred examples of the recurring units represented by the above formula (II) include:

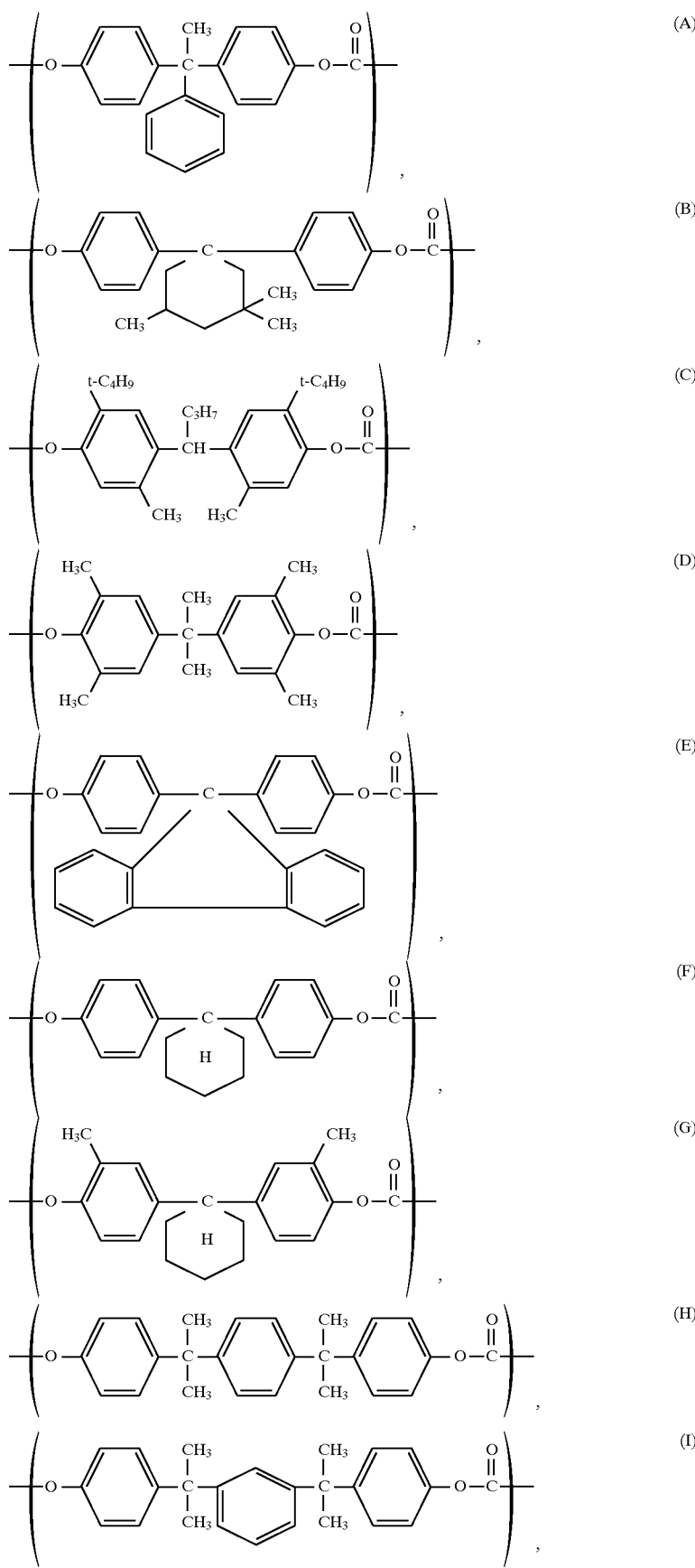

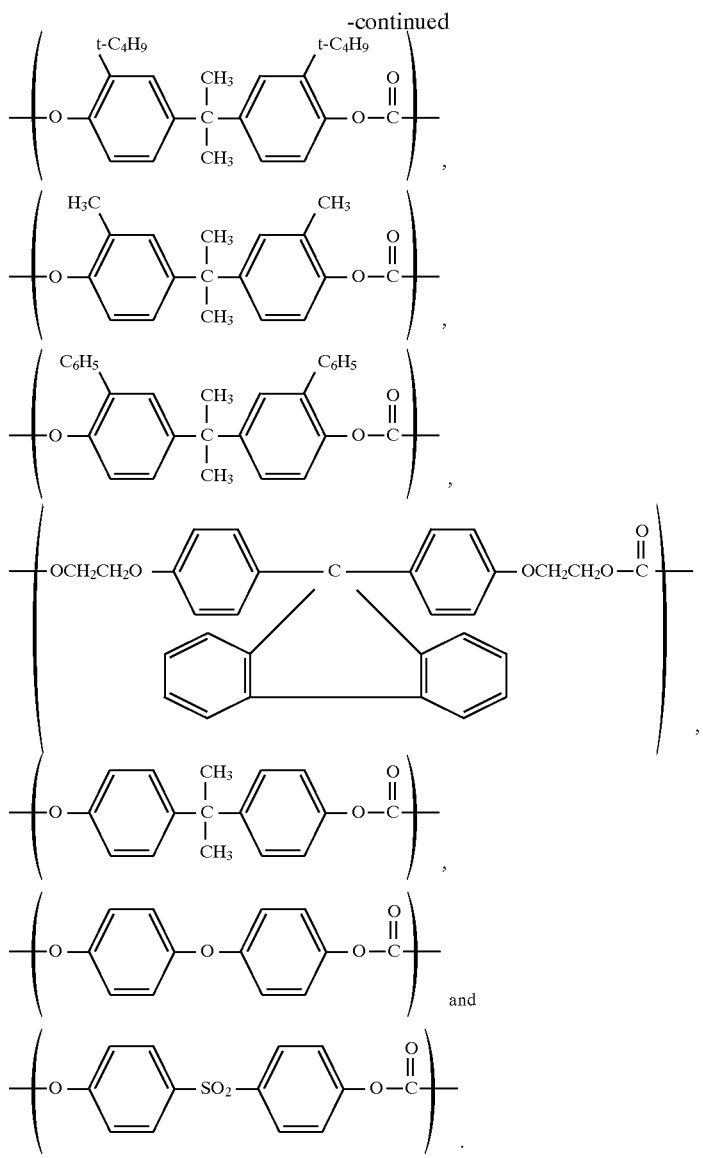

At least one member of the above recurring units (A) to (P) represented by the formula (II) can be contained in the polycarbonate copolymer of the present invention. A combination of a first recurring unit selected from the group consisting of the above (A) to (M) and a second recurring unit selected from the class consisting of the above (N) to (P) is particularly preferred as the recurring units represented by the formula (II).

The polycarbonate copolymer of the present invention comprises 5 to 95 mol % of the recurring units represented by the above formula (I) and 95 to 5 mol % of recurring units represented by the above formula (II). If the proportion of the recurring units represented by the above formula (I) is smaller than 5 mol %, desired optical properties cannot be obtained, while if the proportion is more than 95 mol %, mechanical strength and polymerizability will be insufficient.

The recurring units represented by the above formula (I) are preferably contained in an amount of 7 to 93 mol %, more preferably 10 to 80 mol %, particularly preferably 15 to 75 mol % and the recurring units represented by the above formula (II) are preferably contained in an amount of 93 to 7 mol %, more preferably 90 to 20 mol %, particularly preferably 85 to 25 mol %.

Further, when the recurring units represented by the above formula (II) are a combination of the first recurring unit and the second recurring unit, it is particularly preferred that the proportion of the sum of the recurring units represented by the above formula (I) and the first recurring unit is at least 50 mol % and the proportion of the second recurring unit is less than 50 mol %.

In this case, it is preferred that the proportion of the recurring units represented by the above formula (I) is 95 to 5 mol % and the proportion of the first recurring unit is 5 to 95 mol %.

The polycarbonate copolymer of the present invention has a reduced viscosity ($\eta_{sp}/c$), measured at 20° C. in a solution having a concentration of 0.5 g/dl and containing methylene chloride as a solvent, of at least 0.3 dl/g. The reduced viscosity is preferably in the range of 0.3 to 1.0 dl/g.

The polycarbonate copolymer of the present invention has a photoelasticity coefficient of $70 \times 10^{-13}$ cm$^2$/dyne or less. Since $1 \times 10^{-13}$ cm$^2$/dyne is 1 Brewster (B), $70 \times 10^{-13}$ cm$^2$/dyne or less can be expressed as 70B or less.

The photoelasticity coefficient is calculated from the following equation by applying different tensile stresses to a test piece (10 mm×100 mm×1 mm) of a polycarbonate copolymer in a lengthwise direction and measuring a generated birefringence index,

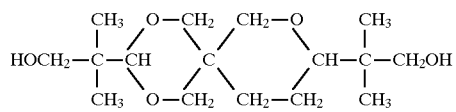

wherein c is an photoelasticity coefficient, $n_1$ and $n_2$ are each birefringence indices for first and second tensile stresses, and $\sigma_1$ and $\sigma_2$ are first and second tensile stresses (dyne/cm$^2$), respectively.

The photoelasticity coefficient is preferably 60B or less, more preferably 50B or less.

Further, the polycarbonate copolymer of the present invention has a glass transition temperature of at least 95° C. The glass transition temperature is preferably at least 110° C., more preferably at least 120° C.

The polycarbonate copolymer of the present invention can be produced by the following production process of the present invention industrially advantageously.

That is, according to the present invention, secondly, there is also provided a process for producing a polycarbonate copolymer which comprises:

melt polycondensing 3,9-bis(1,1-dimethyl-2-hydroxyethyl)-2,4,8,10-tetraoxaspiro[5.5]undecane represented by the following formula (III)

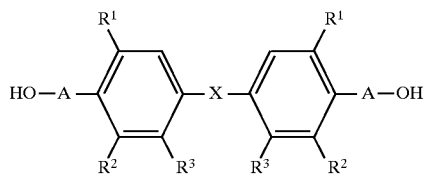

a bisphenol represented by the following formula (IV)

wherein $R^1$, $R^2$, $R^3$, X and A are defined the same as in the above formula (II), and a diarylcarbonate represented by the following formula (V)

$$Ar^1-OCO-Ar^2 \quad (V)$$
$$\underset{O}{\|}$$

wherein $Ar^1$ and $Ar^2$ may be the same or different, selected from phenyl and naphthyl, and may be substituted by at least one member selected from the class consisting of a chlorine atom, an alkyl group having 1 to 6 carbon atoms, a methoxycarbonyl group and an ethoxycarbonyl group, 5 to 95 mol % of the compound of the above formula (III) and 95 to 5 mol % of the compound of the above formula (IV) being used based on the total of the compound of the above formula (III) and the compound of the above formula (IV), and 1.0 to 1.3 mole of the compound of the above formula (V) being used based on 1 mole of the total of the compound of the above formula (III) and the compound of the above formula (IV) so as to produce a polycarbonate having a reduced viscosity of at least 0.3 dl/g.

The compound represented by the above formula (III) can be obtained in the form of white powders having a melting point of about 208° C.

In the above formula (IV), $R^1$, $R^2$, $R^3$, X and A are defined the same as in the above formula (II).

Illustrative examples of the compound represented by the above formula (IV) include 1-phenyl1,1bis(4-hydroxyphenyl)ethane, 1,1-bis(4-hydroxyphenyl), 3,3,5-trimethylcyclohexane, 1,1-bis(3-tert-butyl-4-hydroxy-6-methylphenyl)butane, 2,2-bis(3,5-dimethyl-4-hydroxyphenyl)propane, 1,1-bis(4-hydroxyphenyl)fluorene, 1,1-bis(4-hydroxyphenyl)cyclohexane, 1,1-bis(4-hydroxy-3-methylphenyl)cyclohexane, 1,4-bis[2-(4-hydroxyphenyl)propyl]benzene, 1,3-bis[2-(4-hydroxyphenyl)propyl]benzene, 2,2-bis(3-tert-butyl-4-hydroxyphenyl)propane, 2,2-bis(4-hydroxy-3-methylphenyl)propane, 2,2-bis(4-hydroxy-3-phenylphenyl)propane, 1,1-bis[4-(2-hydroxyethyloxy)phenyl]fluorene, 2,2-bis(4-hydroxyphenyl)propane, bis(4-hydroxyphenyl)ether, bis(4-hydroxyphenyl)sulfone and the like.

In the above formula (V), $Ar^1$ and $Ar^2$ may be the same or different, and is each selected from a phenyl group and a naphthyl group. They may be substituted by a chlorine atom, alkyl group having 1 to 6 carbon atoms, methoxycarbonyl group or ethoxycarbonyl group. These substituents may be used alone or in combination of two or more.

Illustrative examples of the alkyl group having 1 to 6 carbon atoms are the same as those provided above for $R^1$ of the formula (I).

Preferred examples of the compound represented by the formula (V) include diphenylcarbonate, di-p-tolylcarbonate, phenyl-p-tolylcarbonate, di-p-chlorophenylcarbonate, di(2-methoxycarbonylphenyl)-carbonate, phenyl-2-methoxycarbonylphenylcarbonate, di(2-ethoxycarbonylphenyl)carbonate and dinaphthylcarbonate.

The production process of the present invention is carried out using 1.0 to 1.3 mole of a diarylcarbonate represented by the above formula (V) based on 1 mole of the total of the compound of the above formula (III) and the compound of the above formula (IV). A preferred proportion within the above range is 1.005 to 1.10 mole.

5 to 95 Mol % of the compound of the formula (III) and 95 to 5 mol % of the compound of the above formula (IV) are used based on the total of the compound of the above formula (III) which is a diol component and the compound of the formula (IV). A preferred proportion of the compound of the formula (III) is 10 to 80 mol % and that of the compound of the above formula (IV) is 90 to 20 mol %.

The melt polycondensation of these compounds is preferably carried out in the presence of a catalyst or catalysts. A catalyst or catalysts used for an esterification reaction or ester exchange reaction can be used as the catalyst. A compound or catalysts used as the catalyst is selected from alkali metal compounds, alkali earth metal compounds, nitrogen-containing basic compounds, zinc compounds, boron compounds, aluminum compounds, silicon compounds, germanium compounds, organic tin compounds, lead compounds, titanium compounds, osmium compounds, antimony compounds, zirconium compounds and the like. Of these, alkali metal compounds, alkali earth metal compounds and nitrogen-containing basic compounds are particularly preferred.

The alkali metal compounds and alkali earth metal compounds include hydroxides, bicarbonates, carbonates, acetates, hydrogenated borates, stearates and benzoates and bisphenol salts of alkali metals and alkali earth metals.

Specific examples of the alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium benzoate, potassium benzoate, lithium benzoate, disodium hydrogenphosphate, dipotassium hydrogenphosphate, dilithium hydrogenphosphate, disodium salt of bisphenol A, dipotassium salt of bisphenol A and dilithium salt of bisphenol A, sodium salt of phenol, potassium salt of phenol and lithium salt of phenol, and the like.

Specific examples of the alkali earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the like.

Specific examples of the nitrogen-containing basic compounds include ammonium hydroxides having alkyl, aryl and alaryl groups such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide (phenyl-$CH_2(Me)_3NOH$); tertiary amines such as trimethylamine, triethylamine, dimethylbenzylamine and triphenylamine; secondary amines represented by a formula $R_2NH$ (wherein R is an alkyl group such as ethyl or methyl or aryl group such as phenyl or toluyl); primary amines represented by a formula $RNH_2$ (wherein R is the same as above); imidazoles such as 2-methylimidazole and 2-phenylimidazole; ammonium carboxylates such as tetramethylammonium acetate ($Me_4NOCOCH_3$); and basic salts such as tetramethylammonium borohydride ($Me_4NBH_4$) and tetrabutylammnonium tetraphenyl borate ($Me_4NBPh_4$). They may be used alone or in combination of two or more.

These catalysts are used in an amount of $1\times10^{-7}$ to $1\times10^{-4}$ equivalents, preferably $1\times10^{-6}$ to $5\times10^{-5}$ equivalents, based on 1 mole of a diol component when they are alkali metal compounds and/or alkali earth metal compounds.

The melt polycondensation reaction is carried out by distilling out a monohydroxy compound formed by stirring, while heating, a reaction mixture in an inert gas atmosphere, as is conventionally known. The reaction temperature is generally 120° to 350° C. In the latter stage of the reaction, the pressure reduction rate of a system is raised to 10 to 0.1 Torr to facilitate the distillation-out of the monohydroxy compound generated so as to complete the reaction.

Thus, the novel polymer of the present invention can be obtained, and according to application purpose and necessity, additives such as an antioxidant, ultraviolet absorber and mold-releasing agent may be added.

The novel polycarbonate polymer of the present invention can be advantageously used as an information transmission medium such as a material for optical fibers and as an information recording medium such as a material for an optical disk due to its excellent transparency.

The following examples and comparative examples are given to further illustrate the present invention.

EXAMPLE 1

152 parts by weight (0.5 mole) of 3,9-bis(1,1-dimethyl-2-hydroxyethyl)-2,4,8,10-tetraoxaspiro[5.5]undecane (to be referred to as spiroglycol hereinafter) as a diol component, 114 parts by weight (0.5 mole) of 2,2-bis(4-hydroxyphenyl)propane (Bis-A), 225 parts by weight (1.05 mole) of diphenyl carbonate as a carbonate forming compound, $9.1\times10^{-3}$ parts by weight of tetramethylammonium hydroxide and $4\times10^{-4}$ parts by weight of sodium hydroxide as catalysts were charged into a reaction tank equipped with a stirrer, rectifying column and pressure reducing unit. The inside of the reaction vessel was replaced with nitrogen and then, heated to melt these substances. After 30 minutes of stirring, the temperature inside the tank was elevated to 180° C. and the pressure was gradually reduced to 100 mmHg to carry out a reaction for 30 minutes while phenol generated was distilled out.

Thereafter, the temperature was further elevated to 200° C. and the pressure was gradually reduced to 50 mmHg to carry out a reaction for 20 minutes while the phenol was distilled out. The same procedures of temperature-elevation and pressure-reduction as described above were further repeated to 220° C. and 30 mmHg, to 240° C. and 10 mmHg and to 260° C. and 1 mmHg or less, respectively, to continue the reaction. The final reaction was carried out at 260° C. and at 1 mmHg or less for 2 hours.

The thus obtained polymer had a reduced viscosity [$\eta_{sp}/c$], measured at 20° C. in a solution containing methylene chloride as a solvent, of 0.45 dl/g. The polymer had a glass transition temperature, measured by a thermal analyzer (model 2000 DSC) of Du Pont Co., of 114° C. Further, the polymer was dissolved in methylene chloride, formed into a 100 $\mu$m-thick film by a cast molding, and measured for its photoelasticity coefficient with a photoelasticity coefficient measuring instrument (PA-150) manufactured by Riken Keiki K. K. The photoelasticity coefficient was found to be as low as $30\times10^{-13}$ cm$^2$/dyne (≡ 30B) (the same measurement was made on the subsequent following examples and comparative examples).

EXAMPLES 2 to 17

Polycarbonate polymers having properties shown in Tables 1 to 5 were obtained in the same manner as in Example 1, using materials shown in Tables 1 to 5.

TABLE 1

| | Example 2 | Example 3 | Example 4 | Example 5 |
|---|---|---|---|---|
| Composition (mol) | | | | |
| Spiroglycol | 0.4 mol | 0.2 mol | 0.15 mol | 0.1 mol |
| Bis-A | 0 mol | 0.5 mol | 0.25 mol | 0.5 mol |
| Other diol component | 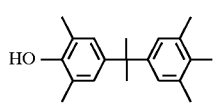 0.6 mol | 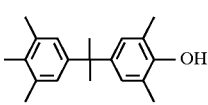 0.3 mol | 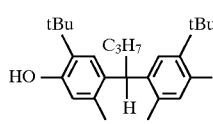 0.6 mol | 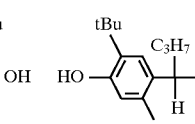 0.4 mol |

TABLE 1-continued

|  | Example 2 | Example 3 | Example 4 | Example 5 |
|---|---|---|---|---|
| $\eta_{sp}/c$ (dl/g) | 0.52 | 0.44 | 0.46 | 0.4 |
| Photoelasticity coefficient (B) | 38 | 42 | 30 | 44 |
| Tg (°C.) | 157 | 150 | 147 | 145 |

TABLE 2

|  | Example 6 | Example 7 | Example 8 | Example 9 |
|---|---|---|---|---|
| Composition (mol) |  |  |  |  |
| Spiroglycol | 0.6 mol | 0.3 mol | 0.15 mol | 0.35 mol |
| Bis-A | 0 mol | 0.5 mol | 0.5 mol | 0.15 mol |
| Other diol component | HO—C₆H₄—(trimethylcyclohexylidene)—C₆H₄—OH | HO—C₆H₄—(trimethylcyclohexylidene)—C₆H₄—OH | HO—C₆H₄—C(Me)(Ph)—C₆H₄—OH | HO—C₆H₄—(9,9-fluorenylidene)—C₆H₄—OH |
|  | 0.4 mol | 0.2 mol | 0.35 mol | 0.5 mol |
| $\eta_{sp}/c$ (dl/g) | 0.51 | 0.57 | 0.45 | 0.39 |
| Photoelasticity coefficient (B) | 15 | 37 | 47 | 35 |
| Tg (°C.) | 137 | 137 | 146 | 136 |

TABLE 3

|  | Example 10 | Example 11 | Example 12 | Example 13 |
|---|---|---|---|---|
| Composition (mol) |  |  |  |  |
| Spiroglycol | 0.25 mol | 0.25 mol | 0.25 mol | 0.25 mol |
| Bis-A | 0.25 mol | 0.5 mol | 0.5 mol | 0.5 mol |
| Other diol component | HO—C₆H₄—(cyclohexylidene)—C₆H₄—OH | HO—(3-Me-C₆H₃)—(cyclohexylidene)—(3-Me-C₆H₃)—OH | HO—(3-Me-C₆H₃)—C(CH₃)₂—(3-Me-C₆H₃)—OH | HO—(3-C₆H₅-C₆H₃)—C(CH₃)₂—(3-C₆H₅-C₆H₃)—OH |
|  | 0.5 mol | 0.25 mol | 0.25 mol | 0.25 mol |
| $\eta_{sp}/c$ (dl/g) | 0.47 | 0.45 | 0.49 | 0.41 |
| Photoelasticity coefficient (B) | 45 | 40 | 50 | 40 |
| Tg (°C.) | 140 | 125 | 121 | 126 |

TABLE 4

|  | Example 14 | Example 15 |
|---|---|---|
| Composition (mol) |  |  |
| Spiroglycol | 0.25 mol | 0.3 mol |
| Bis-A | 0.5 mol | 0.5 mol |
| Other diol component | HO—(3-tBu-C₆H₃)—C(CH₃)₂—(3-tBu-C₆H₃)—OH | HO—C₆H₄—C(CH₃)₂—C₆H₄—C(CH₃)₂—C₆H₄—OH |
|  | 0.25 mol | 0.2 mol |
| $\eta_{sp}/c$ (dl/g) | 0.39 | 0.52 |
| Photoelasticity coefficient (B) | 35 | 50 |
| Tg (°C.) | 120 | 118 |

TABLE 5

|  | Example 16 | Example 17 |
|---|---|---|
| Composition (mol) |  |  |
| Spiroglycol | 0.2 mol | 0.3 mol |
| Bis-A | 0.5 mol | 0 mol |
| Other diol component | 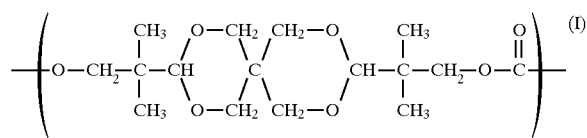 0.3 mol | 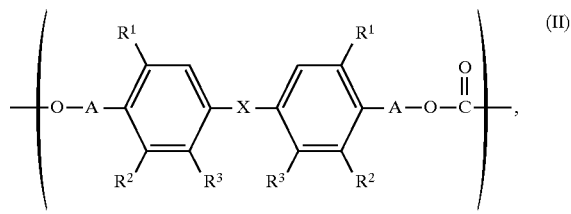 0.7 mol |
| $\eta_{sp}/c$ (dl/g) | 0.43 | 0.35 |
| Photoelasticity coefficient (B) | 40 | 28 |
| Tg (°C.) | 116 | 126 |

Comparative Example 1

A polymer was obtained by repeating the procedure of Example 1 except that only 228 parts by weight of 2,2-bis(4-hydroxyphenyl)propane was used as a diol component. The thus obtained polymer had a reduced viscosity [$\eta_{sp}/c$], measured at 20° C. in a solution containing methylene chloride as a solvent, of 0.49 dl/g, and had a glass transition temperature of 149° C. and a photoelasticity coefficient of as high as $79 \times 10^{-13}$ cm$^2$/dyne.

Comparative Example 2

A reaction was carried out in the same manner as in Example 1 except that only 152 parts by weight (0.5 mole) of spiroglycol was used as a diol component. However, crystallization took place during polymerization.

The solution polymer had a reduced viscosity [$\eta_{sp}/c$] measured at 35° C. in a solution (polymer concentration: 0.6 g/50 ml) containing a solvent mixture (E sol) of 50 volume % of phenol and 50 volume % of tetrachloroethane as a solvent, of 0.25 dl/g.

Since the thus obtained polymer had a glass transition temperature of as low as 92° C. and a low polymerization degree, its strength was insufficient. Therefore, a film having a strength enough to be measured for photoelasticity coefficient could not be formed.

As described above, since the polycarbonate copolymer of the present invention has a smaller photoelastic effect and smaller molding distortion than the polycarbonate resin of the prior art, it has small birefringence and excellent optical properties.

Although a polycarbonate synthesized from spiroglycol and a carbonate forming compound generally has poor heat resistance and mechanical strength, the polycarbonate obtained by copolymerizing it with an aromatic compound can have satisfactory heat resistance and mechanical strength without losing its excellent optical properties.

Therefore, the polycarbonate of the present invention can be effectively used as a material for optical equipment such as an optical disk and a material for various industrial equipment.

What is claimed is:

1. A polycarbonate copolymer which consists essentially of 5 to 95 mol % of recurring units represented by the following formula (I):

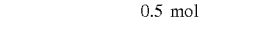

and 95 to 5 mol % of recurring units represented by the following formula (II):

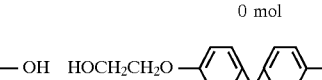

wherein R$^1$ is a hydrogen atom, an alkyl group having 1 to 6 carbon atoms or an aryl group having 6 to 10 carbon atoms; R$^2$ and R$^3$ are each independently a hydrogen atom or an alkyl group having 1 to 6 carbon atoms; A is a single bond or forms, together with the oxygen atom adjacent to A, a group —O—(C$_{2-4}$ alkylene group)—O—; X is selected from the group consisting of a group

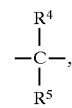

in which R$^4$ and R$^5$ are each independently a hydrogen atom, an alkyl group having 1 to 6 carbon atoms or an aryl group having 6 to 10 carbon atoms, a group

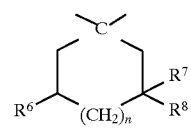

in which R$^6$, R$^7$ and R$^8$ are the same or different and each a hydrogen atom or an alkyl group having 1 to 6 carbon atoms, and n is 0 or 1, a group

—O—, —S—, —SO—, —SO$_2$—, a fluoridene group and a group

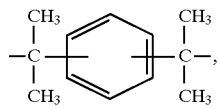

and which has a reduced viscosity ($\eta_{sp}/c$), measured at 20° C. in a solution containing methylene chloride as a solvent and having a concentration of 0.5 g/dl, of at least 0.3 dl/g, a photoelasticity coefficient of 70×10$^{-13}$ cm$^2$/dyne or less, and a glass transition temperature of at least 95° C.

2. The polycarbonate copolymer of claim 1, which consists essentially of 15 to 75 mol % of the recurring units represented by the above formula (I) and 85 to 25 mol % of the recurring units represented by the above formula (II).

3. An information transmission medium consisting essentially of the polycarbonate copolymer of claim 1.

4. An information recording medium consisting essentially of the polycarbonate of claim 1.

5. The polycarbonate copolymer of claim 1, wherein said polycarbonate copolymer has a reduced viscosity ($\eta_{sp}/c$), measured at 20° C. in a solution containing methylene chloride as a solvent and having a concentration of 0.5 g/dl, of at least 0.3 dl/g, a photoelasticity coefficient of 60×10$^{-13}$ cm$^2$/dyne or less, and a glass transition temperature of at least 110° C.

6. A polycarbonate copolymer which consists essentially of 15 to 75 mol % of recurring units represented by the following formula (I):

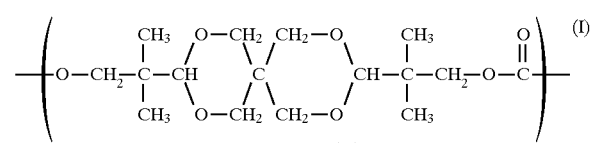

and 85 to 25 mol % of formula (II):

wherein the recurring units of the formula (II) consists of at least one member of first recurring units selected from the group consisting of the following formulas

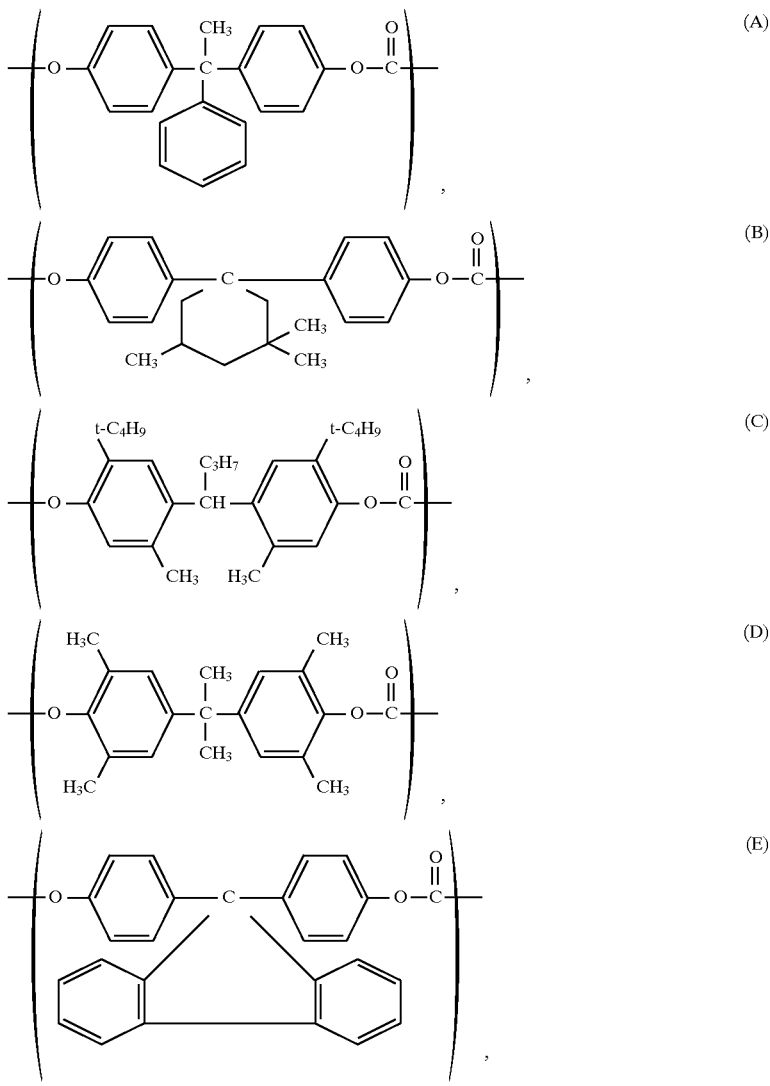

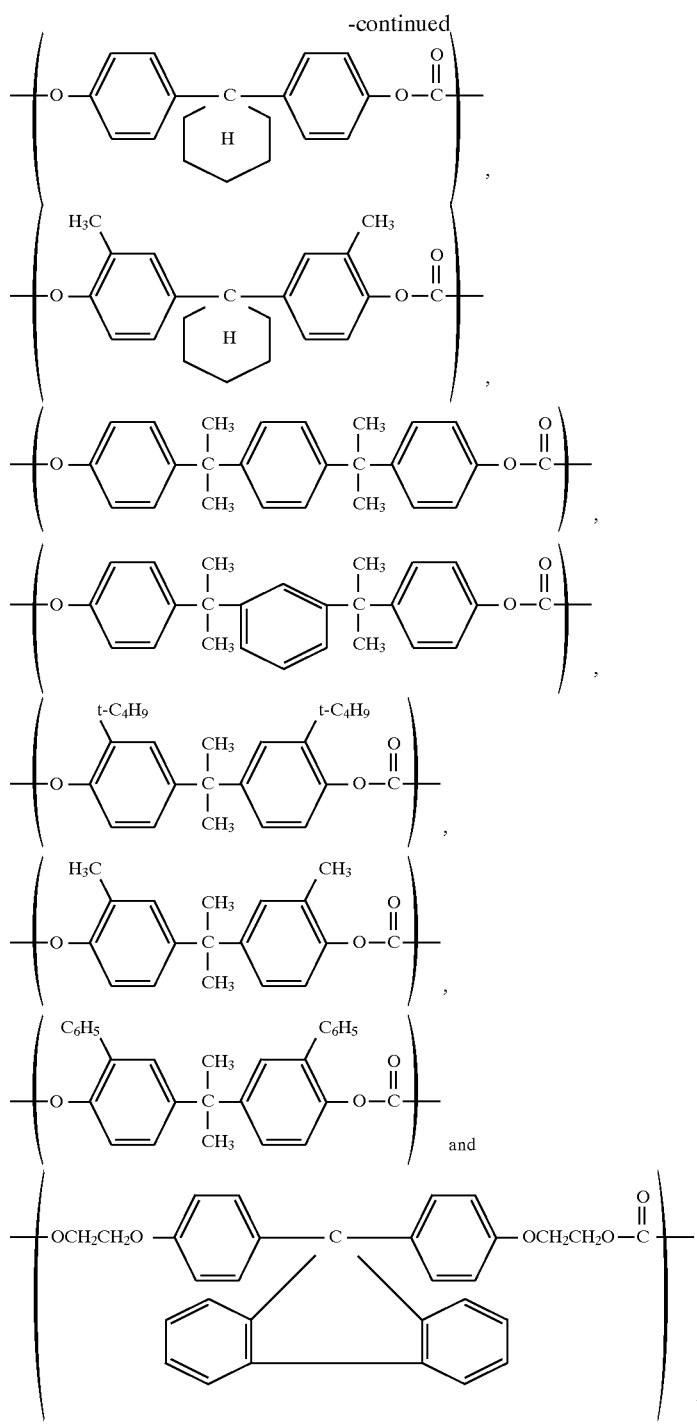
(F), (G), (H), (I), (J), (K), (L), (M)
at least one member of second recurring units selected from the group consisting of the following formulas:
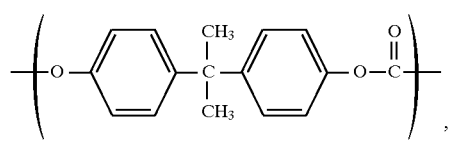
(N)
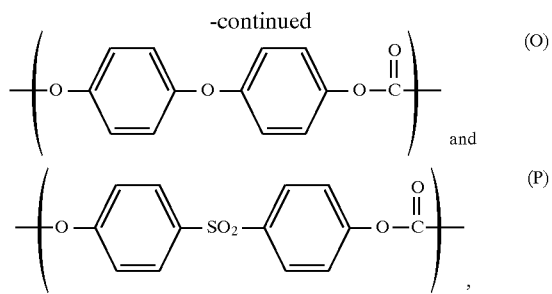
(O) and (P)

wherein said polycarbonate copolymer has a reduced viscosity ($\eta_{sp}/C$), measured at 20° C. in a solution containing methylene chloride as a solvent and having a concentration of 0.5 g/dl, of at least 0.3 dl/g, a photoelasticity coefficient of $60 \times 10^{-13}$ cm$^2$/dyne or less, and a glass transition temperature of at least 110° C.

7. The polycarbonate copolymer of claim 6, wherein the recurring units represented by the formula (II) are a combination of at least one of the first recurring units (A) to (M) and at least one of the second recurring units (N) to (P).

8. The polycarbonate copolymer of claim 7, which has a glass transition temperature of at least 120° C.

9. An optical fiber consisting essentially of the polycarbonate copolymer of claim 7.

10. An optical disk consisting essentially of the polycarbonate copolymer of claim 7.

11. The polycarbonate copolymer of claim 6, which consists essentially of the recurring units represented by the above formula (I) and the recurring units represented by the above formula (II), wherein the recurring units represented by the above formula (II) consist of a combination of at least one of the first recurring units (A) to (M) and at least one of the second recurring units (N) to (P), and the proportion of the sum of the recurring units represented by the above formula (I) and the first recurring units (A) to (M) being at least 50 mol %, and the proportion of the second recurring units (N) to (P) being less than 50 mol %, based on the total amount of the formula (I) recurring units and the formula (II) recurring units.

12. A polycarbonate copolymer which consists essentially of 5 to 95 mol % of recurring units represented by the following formula (I):

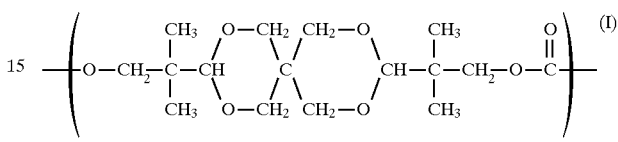

and 95 to 5 mol % of recurring units of formula (II):

wherein the recurring units of the formula (II) consists of at least one member of first recurring units selected from the group consisting of the following formulas

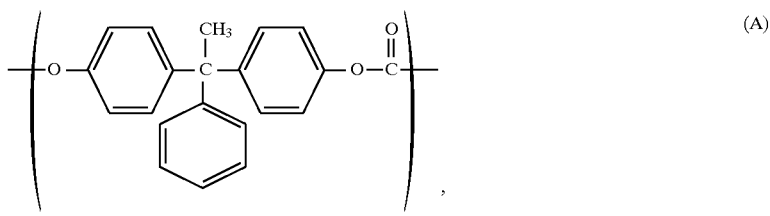

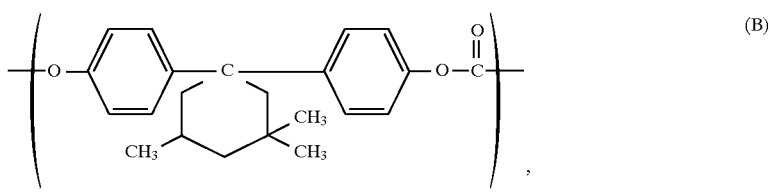

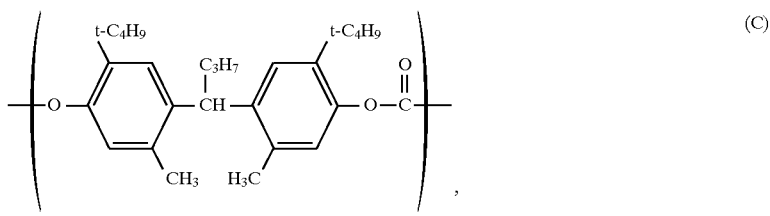

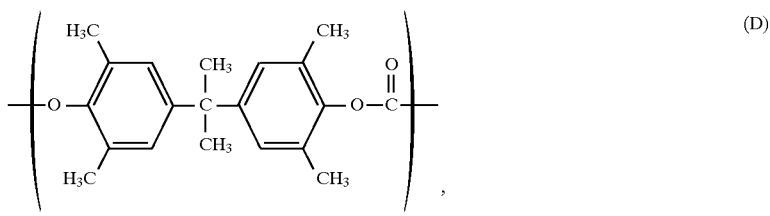

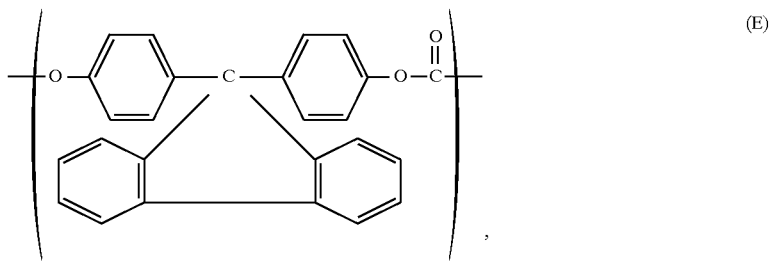

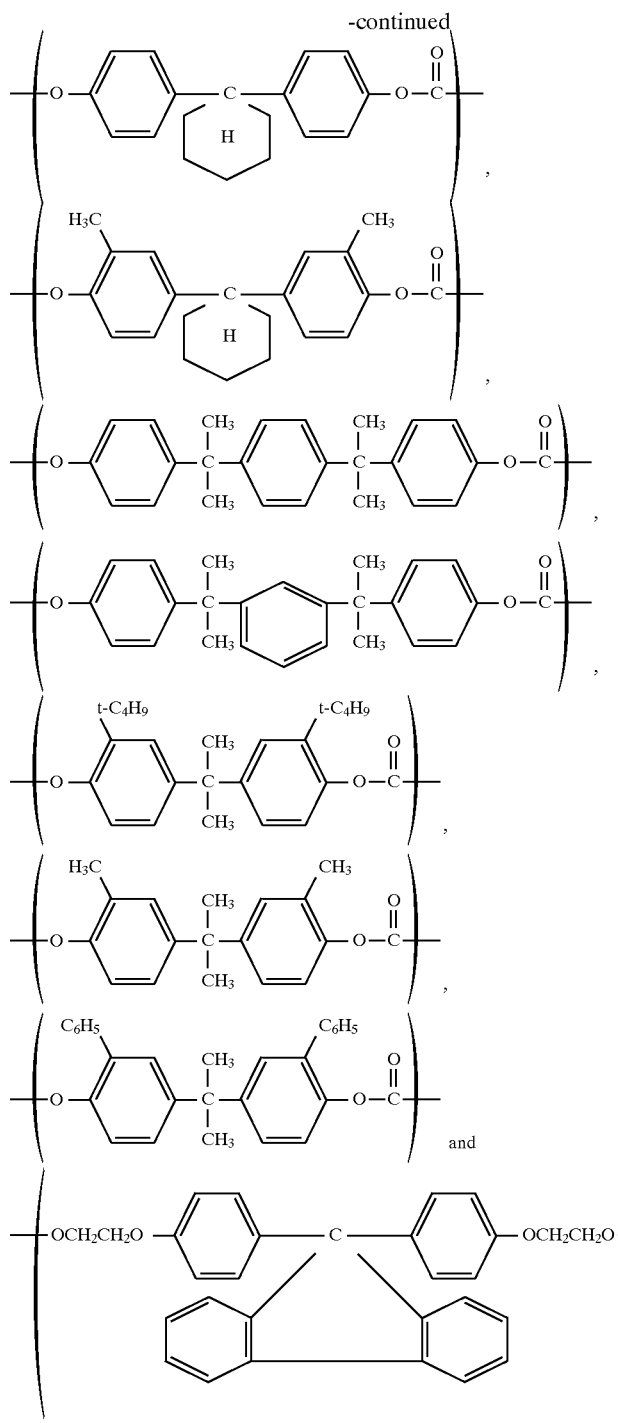
at least one member of second recurring units selected from the group consisting of the following formulas:
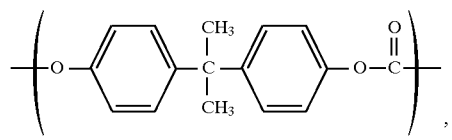
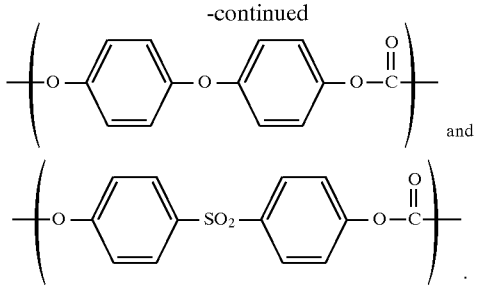

13. The polycarbonate copolymer of claim 12, wherein the recurring units represented by the above formula (II) are a combination of at least one of the first recurring units (A) to (M) and at least one of the second recurring units (N) to (P).

14. The polycarbonate copolymer of claim 13, which has a glass transition temperature of at least 110° C.

15. The polycarbonate copolymer of claim 13, which has a glass transition temperature of at least 120° C.

16. The polycarbonate copolymer of claim 12, which consists essentially of the recurring units represented by the above formula (I) and the recurring units represented by the above formula (II), the recurring units represented by the above formula (II) consisting of a combination of at least one of the first recurring units (A) to (M) and at least one of the second recurring units (N) to (P), the proportion of the sum of the recurring units represented by the above formula (I) and the first recurring units (A) to (M) being at least 50 mol %, and the sum of the proportion of the second recurring units (N) to (P) being less than 50 mol %, based on the total amount of the formula (I) recurring units and the formula II recurring units.

17. The polycarbonate copolymer of claim 12, which has a photoelasticity coefficient of $60 \times 10^{-13}$ cm$^2$/dyne or less.

18. The polycarbonate copolymer of claim 12, which has a photoelasticity coefficient of $50 \times 10^{-13}$ cm$^2$/dyne or less.

19. The polycarbonate copolymer of claim 12, wherein said polycarbonate copolymer has a reduced viscosity ($\eta_{sp}$/C), measured at 20° C. in a solution containing methylene chloride as a solvent and having a concentration of 0.5 g/dl, of at least 0.3 dl/g, a photoelasticity coefficient of $60 \times 10^{-13}$ cm$^2$/dyne or less, and a glass transition temperature of at least 110° C.

20. A process for producing a polycarbonate polymer, which comprises melt polycondensing 3,9-bis(1,1-dimethyl-2-hydroxyethyl)-2,4,8,10-tetraoxaspiro[5.5]undecane represented by the following formula (III)

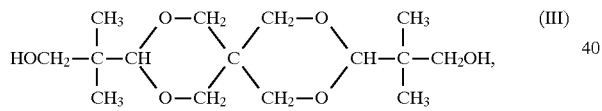

a bisphenol represented by the formula (IV)

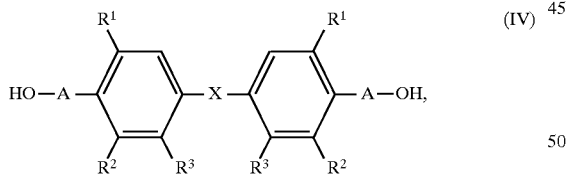

wherein R$^1$ is a hydrogen atom, an alkyl group having 1 to 6 carbon atoms or an aryl group having 6 to 10 carbon atoms; R$^2$ and R$^3$ are each independently a hydrogen atom or an alkyl group having 1 to 6 carbon atoms; A is a single bond or forms, together with the oxygen atom adjacent to A, a group —O—(C$_{2-4}$ alkylene group)—O—; X is selected from the group consisting of a group

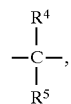

in which R$^4$ and R$^5$ are each independently a hydrogen atom, an alkyl group having 1 to 6 carbon atoms or an aryl group having 6 to 10 carbon atoms, a group

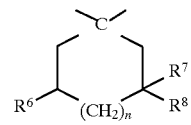

in which R$^6$, R$^7$ and R$^8$ are the same or different and each a hydrogen atom or an alkyl group having 1 to 6 carbon atoms, and n is 0 or 1, a group

—O—, —S—, —SO—, —SO$_2$—, a fluroidene group and a group

and a diarylcarbonate represented by the following formula (V)

wherein Ar$^1$ and Ar$^2$ may be the same or different, and selected from phenyl and naphthyl, and may be substituted by at least one member selected from the group consisting of a chlorine atom, an alkyl group having 1 to 6 carbon atoms, a methoxycarbonyl group and an ethoxycarbonyl group, and wherein 5 to 95 mol % of the compound of the above formula (III) is added to 95 to 5 mol % of the compound of the above formula (IV), and 1.0 to 1.3 mole of the compound of the above formula (V), based on 1 mole of the total of the compound of the above formula (III) and the compound of the above formula (IV), so as to produce a polycarbonate having a reduced viscosity of at least 0.3 dl/g.

21. The process of claim 20 for producing a polycarbonate polymer, wherein the formula (IV) compound consists of at least one member of first recurring units selected from the group consisting of the following formulas

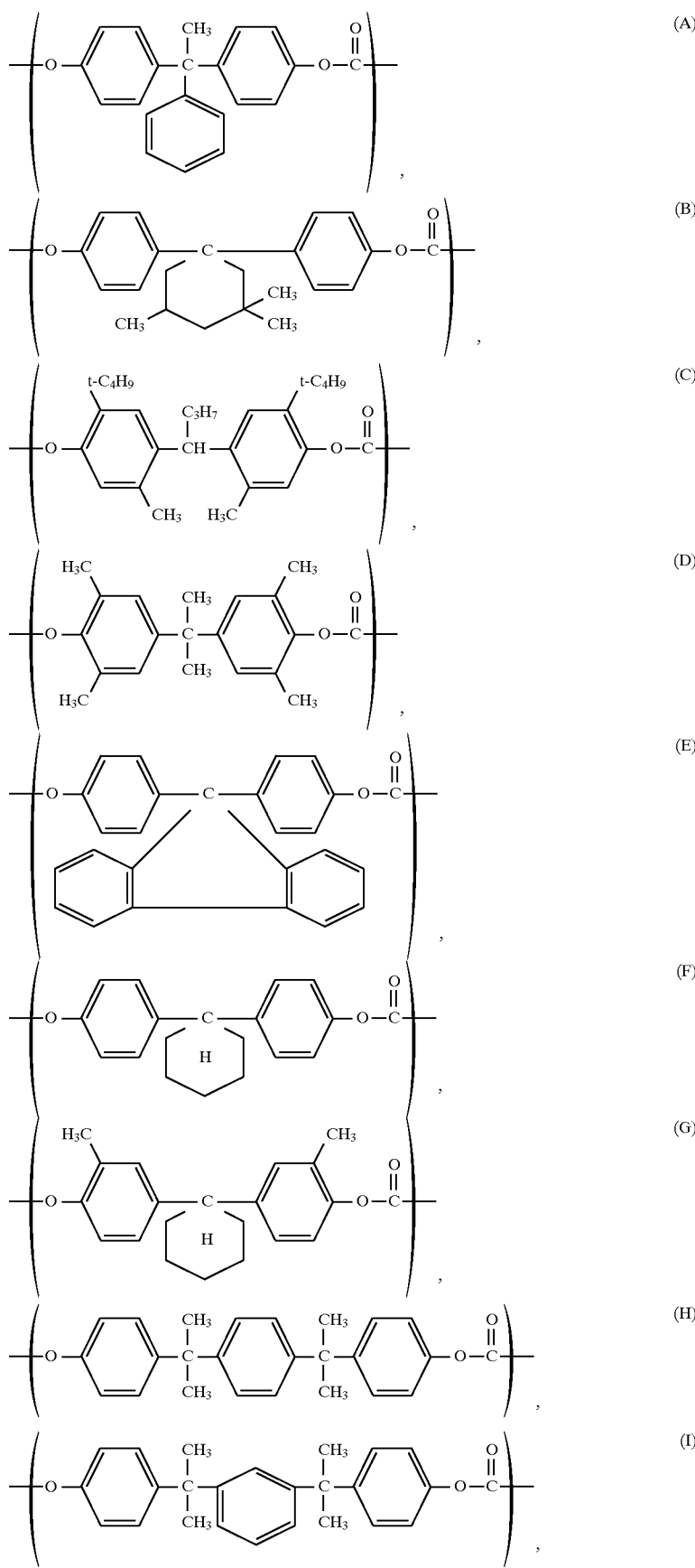

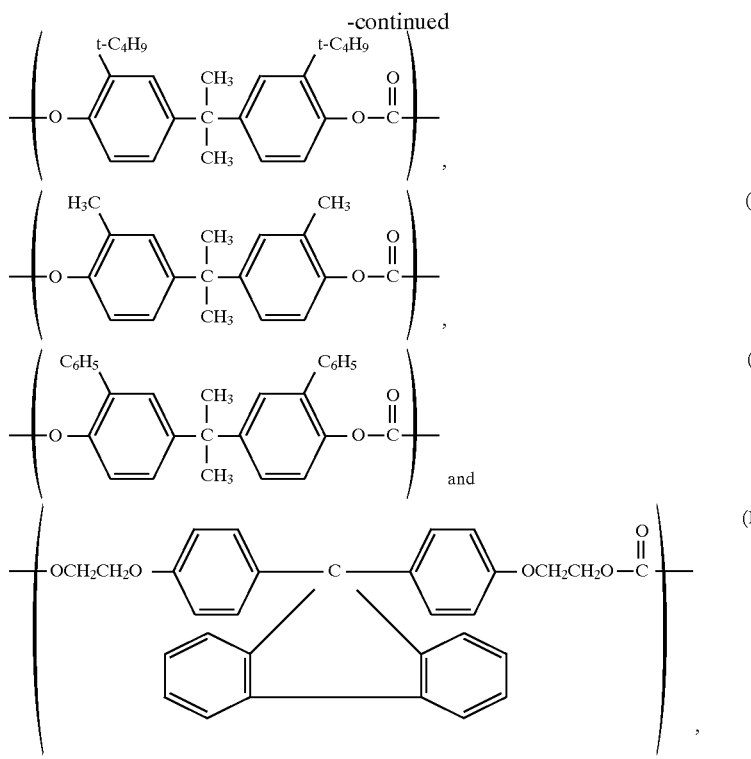

at least one member of second recurring units selected from the group consisting of the following formulas:

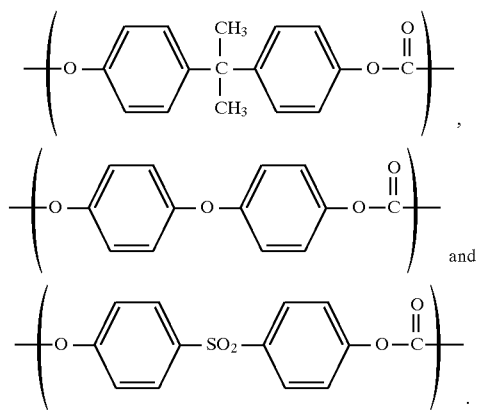

22. The process of claim 21 for producing a polycarbonate polymer,
wherein thetformula IV is
at least one member of first recurring units selected from the group consisting of the above formulas (A) to (M), and
at least one member of second recurring units selected from the group consisting of the above formulas (N) to (P).

23. The process of claim 20 for producing a polycarbonate polymer, wherein said polycarbonate copolymer has a reduced viscosity ($\eta_{sp}/C$), measured at 20° C. in a solution containing methylene chloride as a solvent and having a concentration of 0.5 g/dl, of at least 0.3 dl/g, a photoelasticity coefficient of $60 \times^{-13}$ cm$^2$/dyne or less, and a glass transition temperature of at least 110° C.

* * * * *

UNITED STATES PATENT AND TRADEMARK OFFICE
CERTIFICATE OF CORRECTION

PATENT NO. : 5,858,499
DATED : January 12, 1999
INVENTOR(S) : Masanori ABE, et al.

It is certified that error appears in the above-indentified patent and that said Letters Patent is hereby corrected as shown below:

On the title page insert:
-- [30] Foreign Application Priority Data
    January 30, 1996  (JP)  Japan ............... 8-013784--

Signed and Sealed this

Thirteenth Day of July, 1999

Attest:

Q. TODD DICKINSON

Attesting Officer

Acting Commissioner of Patents and Trademarks